United States Patent [19]

Ismail

[11] Patent Number: 4,814,190

[45] Date of Patent: * Mar. 21, 1989

[54] PROCESS FOR PRODUCING SEMI-MOIST CRANBERRIES AND THE PRODUCT THEREFROM

[75] Inventor: Amr A. Ismail, Machias, Me.

[73] Assignee: Maine Wild Blueberry Company, Machias, Me.

[*] Notice: The portion of the term of this patent subsequent to Dec. 15, 2004 has been disclaimed.

[21] Appl. No.: 132,251

[22] Filed: Dec. 14, 1987

Related U.S. Application Data

[63] Continuation-in-part of Ser. No. 763,603, Aug. 8, 1985, abandoned.

[30] Foreign Application Priority Data

Sep. 12, 1985 [CA] Canada ................................. 490526
Dec. 4, 1985 [JP] Japan ................................ 60-271715

[51] Int. Cl.$^4$ ............................................. A23B 7/14
[52] U.S. Cl. ................................... 426/102; 426/273; 426/290; 426/385; 426/489; 426/639; 426/640
[58] Field of Search ............... 426/599, 639, 468, 486, 426/289, 290, 384, 385, 615, 616, 273, 295, 489, 640, 658, 102

[56] References Cited

U.S. PATENT DOCUMENTS

| | | | |
|---|---|---|---|
| 2,567,038 | 9/1951 | Stevens | 426/599 |
| 2,692,831 | 10/1954 | Weckel et al. | 426/253 |
| 2,865,758 | 12/1958 | Weckel | 426/658 |
| 2,976,159 | 3/1961 | Swisher | 426/103 |
| 3,023,108 | 2/1962 | Anderson | 426/577 |
| 3,142,574 | 7/1964 | Anderson | 426/639 |
| 3,843,810 | 10/1974 | Fehmerling | 426/486 |
| 4,281,026 | 7/1981 | Reale | 426/599 |
| 4,350,711 | 9/1982 | Kahn et al. | 426/639 |
| 4,713,252 | 12/1987 | Ismail | 426/290 |

OTHER PUBLICATIONS

Chenoweth, 1936, How to Make Candy, The MacMillan Company, New York, pp. 115-118.

*Primary Examiner*—Donald E. Czaja
*Assistant Examiner*—Carolyn Paden
*Attorney, Agent, or Firm*—Samuel Meerkreebs

[57] ABSTRACT

A semi-moist cranberry fruit product which is produced by slicing the fruit and through a sugar-spraying process in conjunction with wash-rinsing, surface air drying and vacuum drying or vacuum freeze-drying with sudden release of vacuum. The semi-moist fruit produced has an unusual appearance, consistent, texture and typical, but sweetened cranberry flavor and/or cranberry and orange flavor. Further collecting sweetened juice runoff from the fruit and drying the runoff to produce a taffy-like flavoring additive usable as a candy when the moisture content is reduced to 4-9% or reducing the moisture content to 1-2% and producing a crystalline flavoring additive.

17 Claims, No Drawings

PROCESS FOR PRODUCING SEMI-MOIST CRANBERRIES AND THE PRODUCT THEREFROM

This is a continuation-in-part of application Ser. No. 763,603, filed Aug. 8, 1985, now abandoned in favor of application Ser. No. 923,107, filed Oct. 24, 1986 and now matured in to U.S. Pat. No. 4,713,252 issued Dec. 15, 1987.

FIELD OF THE INVENTION

This invention relates generally to food preservation and sweetening and more particularly to the preservation of cranberries and the preserved product.

DESCRIPTION OF RELATED ART

In application Ser. No. 923,107 filed Oct. 24, 1986 prior art is discussed in detail. Additional prior art, particularly concerning cranberries and their preservation, is as follows:

U.S. Pat. No. 2,692,831, to Weckel et al, concerning preparing maraschino style cranberries including puncturing cranberries, bleaching the punctured cranberries in a SO2 solution from 3–6 days; leaching the bleached berries in water until the pH in the berry is from 3.8–3.9; subjecting the leached berries to a vacuum while covered by water at about 130° F. for a period of about 15–20 minutes at a vacuum of about 23–25 inches; after evacuation, the berries assumed a shriveled condition and the berries are next blanched in steam, then the blanched berries are subjected to dyeing and sweetening treatments to color and introducing sugar into the cranberries.

U.S. Pat. No. 2,865,758 to Weckel, concerning puncturing the air sacks of cranberries, submerging the punctured berries in a concentrated aqueous sugar syrup containing calcium chloride and alum and subjecting the berries in the syrup to a vacuum treatment while the temperature of the berries are maintained at a temperature below 130° F. until the vacuum treatment is completed.

U.S. Pat. No. 2,976,159 to Swisher, concerning combining a firm fibrous fruit substance from a class consisting of citrus peel, pomes, pineapple, cranberries & coconuts impregnated with not less than 10% corn syrup solids and a range of from 16% to 20% glycerol.

U.S. Pat. No. 3,023,108 to Anderson, concerns preparing a whole cranberry sauce characterized by boiling whole cranberries from about 30 seconds to 3 minutes in an aqueous sugar solution with from about 1 to 10% their weight of finely comminunuted cranberries, the amount of water and sugar in said solution being such as to form a sauce having a soluble solids content from 38–42% by weight.

U.S. Pat. No. 3,142,574 to Anderson, concerning forming a cranberry relish comprising the steps of comminuting whole cranberries to form particles substantially all of which are less than ½ inch in maximum dimension but greater than 0.001 inch whereby discrete identifiable cranberry particles are formed; cutting orange peel and forming cube-like particles ranging from ⅛" to ¼"; adding cranberries to a water solution of sugar and rapidly heating the resulting mixture to a temperature between about 180° and 200° F.; adding the orange peel particles to the heated mixture and rapidly further heating to a temperature between about 200° and 125° F. and thereby to form a relish product, and cooling the relish product as rapidly as possible to at least 120 F. to protect the color and flavor.

SUMMARY OF THE INVENTION

The present invention, in accordance with the disclosure of U.S. Pat. No. 4,713,252 which is incorporated by reference herein, provides an improved cranberry product produced by a novel process, by controlling the moisture content of the product and sweetness of the cranberry product, and retaining therein the natural color and flavor of the fruit and in fact enhancing the fruit-flavor and texture, and by minimizing residual surface moisture thus minimizing the energy-expenditure through vacuum drying and freeze-dry, both drying being accomplished with a sudden release of vacuum over a controlled period, thus providing a cranberry product substantially comparable to those of the earlier patent but which is unusual in appearance, taste, shelf life, feel and touch to one's hand and palate.

Further, the present invention in conformance with what is set forth above, concerns a process and product produced thereby, in which sweetened dried fruit has a moisture range from 10% to 40% including rupturing or slicing fresh or frozen cranberries to expose the fruit interior, coating the sliced cranberries with sugar or high fructose corn syrup and achieving an osmotic sugar exchange within the fruit, thus producing a sugared fruit and fruit syrup. The process further includes separating the syrup from the fruit, rinsing the sugared fruit sufficient to remove surface sugar and/or syrup from the fruit, rinsing the fruit, air-drying the fruit and vacuum drying or freeze/drying the fruit, and suddenly releasing the vacuum over a period of within 1 to 2 minutes to collapse the fruit to a relatively wrinkled, solid chewy and palatable condition.

The sugared fruit syrup is diluted with water, freeze dried whereby a crystalline flavoring product is produced. In conformance with that set forth above, a cranberry flavoring product is produced which is usable as a cooking ingredient in combination with other foods and mixtures.

It was found that the runoff from the sugared cranberries when reduced to a moisture content of from 4–9%; as will be demonstrated in the example below, the product comprised a taffy-like consistency. Thus combination flavoring and/or candy product was produced. The product has an excellent cranberry color and a distinct tangy and sweetened cranberry flavor. The product can be used as a chewy, energy-providing flavorful natural-ingredient candy and/or as a sweetener where the cranberry flavor and color are desired.

Likewise, in the case of blueberries and/or cherries, as described in the examples, below, the runoff syrup of these products can be moisture-controlled to produce the taffy-like consistency for the purposes mentioned.

Additionally, the blueberry, cherry and cranberry sugared flavoring products can be used alone or in combination, with each other or with still other fruits. For example, it is contemplated to be within the scope of the combinations to use: blueberry/cherry; blueberry/cranberry; blueberry/cherry/cranberry; cherry/cranberry; and blueberry/cranberry.

These together with other and specific advantages of the invention will become apparent from the following description, in which:

DESCRIPTION OF PREFERRED EMBODIMENTS

As has been described in detail in applicant's earlier patent, blueberries and cherries were processed utilizing applicant's disclosed apparatus and procedures. Cranberries, outside of the obvious differences of color and taste, include a relatively thick waxy skin which must be penetrated i.e. ruptured or sliced in order to gain access to the cranberry fruit cavity and inner structure. Accordingly, a difference between the present application and applicant's earlier application is that the cranberry fruit because of physical differences, is ruptured or sliced; after a preliminary screening and separation of damaged fruit, vines and/or removal of extraneous material.

After rupturing through puncturing or slicing is accomplished, cranberries are sugared, using either sucrose, granular sugar, high fructose corn syrup etc., by osmotic transfer or exchange between liquid in the fruit and the sugar; next the fruit is separated from the fruit-syrup produced during sugaring; next the syrup is washed off the fruit to reduce stickiness then free surface moisture is blown off by an air stream which materially reduces vacuum drying and/or freeze-drying times and the attendent costs; next, the fruit is dried by vacuum drying and or freeze-dried under a vacuum, and with the very rapid release of vacuum (within 1 to 2 minutes), the cranberries, just as in the case of blueberries and cherries, achieves a "collapsed" shape and texture of a semi-moist fruit. During vacuum drying, about 30 in. Hg. is used, or in freeze drying about 400 to 1200 microns Hg. of vacuum is utilized.

The ratio of the cranberries may range from 1 to 5 parts of fruit to one part of sugar. The preferred ratio is about three parts of fruit to one part to sugar. Alternately the ratio of two parts fruit to one part of sugar. The sugar may comprise various types such as sucrose, fructose corn syrup or dextrose, taking both granular and or liquid forms or both.

The ruptured or sliced fresh natural or frozen cranberies are mixed with the suitable sugar or sweetener in a tumbler or mixed in any other suitable manner; next syruping proceeds in a soaking tank with agitation up to about 12 hours (depending on fruit temperature) when held at conventional room temperatures ranging from about 70° F. to 80° F. Heating up to 140° F. can be applied to accelerate the syruping process. Further, gentle vibration or oscillation of the soaking tank may be provided to the soaking tank to cause liquid and cranberry oscillation and enhanced mixing. The Brix scale reading for the sugared syrup derived from the cranberries will reach from 35-40 Brix while the Brix scale reading for the solids inside the cranberries range from 12° to 31° Brix, preferably 19.9° to 33° Brix.

After the desired Brix reading is attained, the syrup is strained off the cranberries and the sweetened runoff is utilized as is, or freeze dried to taffy-like consistency, or further dried to a crystaline form, i.e., as a jelly flavoring or a pancake syrup component etc.

Next the sugared cranberries are rinsed under a cold, rinse-water jet sufficient to remove excess syrup off the fruit. The rinse water temperature can range from 40°-70° F. and serves the purpose of both removing the syrup and pre-cooling the cranberries to subsequent freezing and/or drying.

Although use of a cold water jet is contemplated, immersion rinsing is also feasible. After rinsing, the use of "air knives" or air jets are contemplated to promote further removal of extraneous surface moisture. The air removal of water reduces the total water content of the cranberries by as much as 7-9%, which enhances economic commercial production of the dehydrated cranberries through reduced energy consumption in vacuum and freeze drying.

The cranberries can then be either IQF (individual quick frozen) and held in conventional cold storage until vacuum or freeze dried or used immediately. Sweetened, rinsed and surfaced-dried cranberries are then dried up to a moisture content of between 10-40% level, and preferably between 12% to 19% by weight.

Next during both vacuum drying and freeze-drying, under vacuum conditions of either 30 inches Hg or 400-1200 microns Hg, respectively, the vacuum condition is suddenly terminated (within 1 to 2 minutes). Just as in the case of blueberries and cherries, the evacuated cranberries are produced in the desired form, appearance, and touch and feel to the hand and the palate. During release of vacuum, the drying chamber can be simutaneously purged with either air or nitrogen. Preferably, the cranberries are then coated with an anti-caking agent to allow for free flowing of the dehydrated cranberry pieces.

In summary, the invention entails the manufacture of sweetened semi-moist fruit products and particularly cranberry products. In this invention, liquids from fruits are leached out and sugar molecules are impregnated or transferred into the fruit parts and cells by an osmotic syrupping process. In syrupping, fresh or frozen cranberries, blueberries of the lowbush and highbush types and cherries were mixed with sugar at different ratios. The fruit sugar mixture is allowed to stand and syrupping occurs, i.e., where fruit juice defuses out of the fruit and sugar molecules dissolved in the emerging liquid and then migrate into the fruit. The syrupping process is accelerated by regulating temperature and adding mixing-movement to the fruit/syrup mixture. At a specific end point, the syrup and sweetened fruit are separated. For example, when the Brix scale of the syrup reached 35°-40° Brix and soluble solids in the juice of the sweetened cranberries ranged from 12°-31° Brix, the sweetened cranberries and syrup is separated. Excess adhering syrup is removed from the sweetened cranberries by washing or rinsing with cold water. Free water on the surface of the sweetened fruit is then removed by subjecting the fruit to shaking/vibrating movements and to jet air blasts. The fruit is then frozen and held frozen and then vacuum dried or freeze-dried to moisture levels of (10-40%) subject to end use. The vacuum used in either vacuum drying or freeze drying at either 30" Hg or 400-1200 microns Hg is released suddenly, from between 1 to 2 minutes. The fruit is then coated with anti-caking material (such as Durkex 500 TM, calcium stearate, Cantab TM, or others), and packed in various size and type containers.

EXAMPLE I

Individual quick frozen wild (lowbush) blueberries were mixed with granular sugar (sucrose) and/or syrups containing high sugar (fructose) content at different ratios, by weight, of fruit to sugar. Twenty pounds of blueberries were used with the granulated sugar ratios and ten pounds of blueberries with the sugar syrup mixture. The following table (Table 1-A) illustrates the kinds of sugar, and fruit to sugar ratios used.

TABLE I-A

Blueberry and Sugar Mixing Ratios
TREATMENT: Fruit and Sugar

| No. | Blueberry (lb.) | Sugar (lb.) | Type Sugar |
|---|---|---|---|
| 1 | 20 | 20 | 1:1 sucrose granular |
| 2 | 20 | 10 | 2:1 sucrose granular |
| 3 | 20 | 6.7 | 3:1 sucrose granular |
| 4 | 10 | 10 | 1:1 high fructose corn syrup, Brix = 82° |
| 5 | 10 | 10 | 1:1 corn syrup, Brix = 75° |

The temperature of the frozen blueberry fruit was −10° F. and the soluble solids in the fruit juice was 12%. The fruit and sugar or syrup were mixed thoroughly, placed in separate plastic tubs and allowed to stand at a temperature in the range of 50°-60° F.

The effect of mixing blueberries and sugar at different ratios is presented in Tables I-B and I-C.

TABLE I-B

Effect of mixing blueberries and sugar at different ratios on sugar content in blueberries and syrup.

| Treatment No. | Soaking duration (Hr.) | Product temp. | Blueberry Soluble Solids (%) (Not [Rinsed]) | [Rinsed] | Syrup Brix % |
|---|---|---|---|---|---|
| #1 | 21 | 36° F. | — | — | sugar, largely undissolved |
| #2 | 21 | 34° F. | — | — | sugar, largely undissolved |
| #3 | 21 | 38° F. | 21 | 18 | 45 |
| #4 | 21 | 50° F. | 22 | 21.2 | 43 |
| #5 | 21 | 46° F. | 24 | 21 | 38 |
| #6 | 28 | 58° F. | 35.6 | 22 | 64, some undissolved sugar |
| #7 | 28 | 56° F. | 33 | 27 | 48 |
| #8 | 28 | 42° F. | 24 | 20.2 | 41 |
| #9 | 28 | 60° F. | 31 | 27 | 43.6 |
| #10 | 28 | 58° F. | 24 | 24 | 40 |
| #11 | 45 | 59° F. | 47 | 27.6 | 62, some undissolved sugar |
| #12 | 45 | 59° F. | 36.4 | 27.2 | 45 |
| #13 | 45 | 60° F. | 25 | 23.6 | 34 |
| #14 | 45 | 60° F. | 35 | 30 | 41.4 |
| #15 | 45 | 60° F. | 32 | 31.8 | 40.4 |

When frozen blueberries were mixed with granular sugar at the ratio 1:1 by weight and allowed to stand at temperature of approximately 50°-60° F. for 45 hours, a considerable amount of sugar added (approximately 25%) did not go into solution and remained in a crystalline form.

At the tested mixture ratios from 1:1, 2:1 and 3:1, by weight, of fruit to granular sugar, and 1:1 of fruit to similar weight of high fructose corn syrup (Brix=82°) and of corn syrup (Brix=75°) which were allowed to stand at 60° F., a syrupping process took place where juices moved out of the fruit and sugar molecules moved in and impregnated the fruit.

Sweetened fruit from all treatments had a very pleasant sweet flavor, in addition to their distinct blueberry flavor. All syrup produced had the distinct color and flavor of blueberries.

TABLE I-C

Final yield of sweetened blueberries and syrup
45 hours after mixing blueberry and sugar

| Treatment No. | Blueberry Yield (%) | Syrup Yield (%) |
|---|---|---|
| #11 | 24.4 | 75.5 (contained undissolved sugar) |
| #12 | 33 | 67 |
| #13 | 43.5 | 56.4 |
| #14 | 31.5 | 68.5 |
| #15 | 31.4 | 68.6 |

EXAMPLE II

Thirty pounds of individual quick frozen cultivated (highbush) blueberries were mixed with ten pounds of sugar and placed in a plastic tub. The plastic tub was then placed in a water bath where water temperature was maintained at 130° F. for eight hours. The plastic tub containing the blueberry-sugar mixture was oscillated and the contents jostled once, every 30–60 minutes, to further mix the blueberries, sugar, and emerging syrup.

The soluble solids in the juice of the blueberries was 10% and the temperature of the fruit when mixed with sugar was 10° F.

Eight hours after mixing, soaking in a water bath at 130° F., and occasionally rolling and shaking of the contents, the syrupping process was terminated and the berries were separated from the syrup. Seventeen pounds of sweetened blueberry fruit were recovered (42.5% of total mixture) and the weight of the syrup was 22.6 pounds (56.6 of total mixture). Soluble solids in the juice of the sweetened berries were 20% and the Brix of the syrup was found to be 44°.

The fruit had a sweet and pleasant mild blueberry flavor, and the syrup possessed a purple color which was much lighter in density and had a milder blueberry flavor when compared to syrup obtained from Example I; primarily because cultivated blueberries initially, before treatment, have this characteristic.

EXAMPLE III

Individual quick frozen wild blueberries (lowbush) were mixed with sugar at different ratios by weight varying between one and five fruit to one syrup. The temperature of the frozen blueberries was −2° F. and the soluble solids in the blueberry juice was 12%. The fruit and suger were mixed well, then placed in plastic containers and allowed to stand at room temperature (approximately 70–80 F.) for fourteen hours. The syrupping process earlier described in the previous example took place in all the fruit to sugar ratios here tested and the results of solids contents in fruit and syrup are listed in the following table:

| Mixture Ratio | Ingredient weight (gm) Blueberries | Sugar | Blueberry Soluble Solid (%) | Syrup Brix |
|---|---|---|---|---|
| 1:1 | 1000 | 1000 | 31 | 49 |
| 2:1 | 1000 | 500 | 28 | 45 |
| 3:1 | 1000 | 333 | 23 | 38 |
| 4:1 | 1000 | 250 | 21 | 33 |
| 5:1 | 1000 | 200 | 20 | 29 |

Differences were noted in flavor of the sweetened blueberries, with fruit from the 3:1 fruit to sugar ratio by weight most preferred. They had a delightful balance between sweetness and the delicate, but distinct flavor of wild blueberries.

EXAMPLE IV

Three hundred pounds of individual quick frozen blueberries were mixed with one hundred pounds of sugar in a commercial Gemco TM tumbler/blender for five minutes. The sugar coated blueberries were then placed in aluminum trays with these approximate dimensions: 30" long×18" wide×6" high. The sugar coated blueberries were placed in the trays to a height of only four inches. The trays were allowed to stand at room temperature of approximately 70° F. for approximately fourteen hours. During this period the syrupping process took place. After reaching equilibrium, the sweetened fruit was separated from the syrup, placed in a wash tank (K-10 washer by Key Technology of Milton Freewater of Oregon) where it was washed with cold water (40°-50° F.), the blueberries were then placed on a vibrating shaker/mover (ISO-FLO dewatering shaker by Key Technology) where they were further sprayed with fresh water (40°-50° F.) to further remove adhering syrup, then passed beneath air jets for surface water removal from the rinsed fruit. The sweetened, washed, rinsed air dried fruit was then individually quick frozen (IQF) in a freezing tunnel (Frigoscandia TM Flow-Freeze freezing tunnel, of Frigoscandia Contracting Inc., Bellevue, Wash.) where they were frozen to −15° F. The frozen fruit were then held in regular commercial cold storage at −10° F.

Twenty-eight pounds of the frozen sweetened fruit having a soluble solids readings of 29° Brix in the juice was then vacuum dried in a vacuum tumbler dryer (Paul O. Abbe Rota Cone Vacuum Dryer of Paul O. Abbe, Inc., Little Falls, N.J.). Temperature of the blueberries was 0° F., and the temperature of the oil circulating betweend the dryers' jacketed walls were set at 150° F., and the drying cone rotated at 5 RPM (rounds per minute). Vacuum was measured at 30 in. Hg. The following table illustrates the vacuum drying conditions:

| Time elapsed | Blueberry temperature | Oil/Drum temperature | RPM | Vacuum | Oil Pressure |
|---|---|---|---|---|---|
| Start | 0° F. | 150° F. | 5 | 0 in Hg. | 0 Psi |
| 30 mins. | 60° F. | 200° F. | 5 | 30 | 30 |
| 180 mins. | 88° F. | 200° F. | 5 | 30 | 30 |
| 240 mins. | 88° F. | 200° F. | 5 | 30 | 30 |

*Drained/removed free juice = 8.28 lbs., Brix = 28°, temperature = 60° F.

After 240 minutes of vacuum-drying at 30 in. Hg., the vacuum was released suddenly (in less than 2 minutes) and the semi-moist blueberries were then removed from the dryer and allowed to cool to room temperature. The blueberries were chewy, had a good flavor, collapsed appearance, were free flowing and shelf stable. The amount of semi-moist blueberries were 7.87 pounds, representing a yield of 28.1% from the initial amount of frozen, sweetened blueberries. Moisture content was 18%.

EXAMPLE VIII

Frozen blueberries were sweetened with high fructose corn syrup (HFCS) at a ratio 2 blueberries to 1 HFCS by weight as described in Example 1. When the soluble solids of the sweetened blueberries reached 27° F. Brix, they were then separated from the syrup and rinsed as described in Example VII. The sweetened, rinsed blueberries were chilled to a temperature of 26° F., then vacuum dried as described in Example VII above. The following conditions were attained:

| Time elapsed | Blueberry temperature | Oil/Drum temperature | Drum RPM | Drying Vacuum | Oil Pressure |
|---|---|---|---|---|---|
| Start | 26° F. | 200° F. | 5 | 30 in Hg | 30 psi |
| 20 mins. | — | 200° F. decreased to 150° F. | 5 | 30 | 30 |
| 140 mins. | 70° F. | 150° F. | 5 | 30 | 30 |

*Removed free juice = 0.71 lb., Brix = 40°, temperature = 86° F.

After 140 minutes of vacuum-drying under the aforementioned conditions, the amount of semi-moist blueberries recovered was 6.86 pounds of 37.1% of the sweetened blueberries used, and had a moisture content of 24%. The dehydrated blueberries had excellent blueberry flavor, but were slightly sticky to the touch.

EXAMPLE IX 27.65 pounds of frozen sliced cranberries were sweetened with sucrose (granular sugar) as described in the earlier examples, at a weight ratio of 3 portions of cranberries to 1 portion of sugar. The cranberries were sweetened, as described in earlier examples, until their soluble solids reached 31% Brix, and thereeafter were separated from their syrup, washed, rinsed and chilled. They were then vacuum, tumbled dried under the following conditions:

| Time elasped | Cranberry temperature | Oil/Drum temperature | Drum RPM | Drying Vacuum | Oil Pressure |
|---|---|---|---|---|---|
| Start | 15° F. | 200° F. | 5 | 30" Hg | 30 psi |
| *15 min. | — | 200° F. reduced to 150° F. | 5 | 30" hg | 30 psi |
| **90 mins. | | | | | |
| 210 mins. | 66° F. | 150° F. | 5 | 30" Hg | 30 psi |
| 585 min. | 120° F. | 200° F. | 5 | 30" Hg | 30 psi |

*drained/removed free juice = .89; Brix = 33°; temperature = 72° F.
**at 90 minutes, the cranberries in the drum were checked and found to be very moist.

The vacuum was released at the end of 585 minutes, suddenly within 1–2 minutes. The cranberries were removed from the drum, they were found to be semi-moist, had an excellent flavor and were sweet and tangy. The product was chewy in texture, pleasant to the palate, and was shelf stable. The final product of cranberries weighed 8.13 pounds, representing a 29.4% yeild from the sweetened, rinsed cranberries and had a moisture content of 12% by weight.

EXAMPLE X

Frozen cranberries were thawed to temperature of 25° F., then sliced and sweetened with HFCS at a ratio of 2 cranberries to 1 HFCS by weight. The sweetened cranberries, when their soluble solids reached an average of 21.4° Brix, were separated from the syrup, washed, rinsed with fresh water, and individually quick frozen (IQF). They were then placed in ribbed trays and freeze-dried as described in Example IV above. One thousand and five pounds of IQF sweetened cranberries were used. Their moisture content was 73.38% by weight, and the trays were uniformly filled with an average of 9.75 lbs. of cranberries per tray. After a drying cycle of 8 hours, the vacuum was released suddenly, being replaced by air between 1 to 2 minutes. Three hundred and ten pounds of semi-moist cranberries were produced, representing a yield of 30.85% from the sweetened and rinsed cranberries, and they had a moisture content of 20.08% by weight.

The novel cranberry product had an attractive appearance, possessed excellent cranberry flavor, was tart and tangy and was sweet to the palate. It was chewy and had a pleasant feel to the teeth, mouth and palate. The product was shelf stable and free flowing.

Coating the semi-moist cranberries with 0.5% Durkex 500 TM, as described in Example VI, above, further enhanced the appearance and flowability of this novel cranberry product.

EXAMPLE XI

Frozen cranberries were sliced as in the previous example and mixed with chopped orange peels at the ratio, by weight, of 95% cranberries to 5% orange peel. The cranberry and orange peel mix was then sweetened with HFCS, separated from the syrup, washed, rinsed individually quick frozen, then freeze-dried as described in the previous example. After freeze drying in a vacuum, vacuum was suddenly replaced by air from 1 to 2 minutes. The soluble solids of the cranberry/orange peel mix after rinsing was 23% Brix, and their moisture content before drying was 73.09% by weight.

After freeze drying, the moisture content of the novel semi-moist cranberry/orange was 18.77% by weight. The product had a delightful flavor of sweetened tangy cranberries, accentuated by a trace of orange flavor and a chewy texture providing a pleasant taste and feel. It was shelf stable and did not require freezing or refrigeration for storage.

EXAMPLE XII

Sliced, individually quick frozen cranberries were allowed to thaw, then were sweetened with HFCS (High fructose corn syrup) at a ratio of 2 cranberries to 1 HFCS by weight; the sweetened cranberries were then separated from the syrup, washed, rinsed and frozen. Their soluble solids averaged 19.9° Brix. Their moisture content was 76.52% by weight. The sweetened cranberries were then freeze-dried as described in Example X, above, to an intermediate moisture of 19.14% by weight i.e., vacuum was replaced by air, suddenly from between 1 to 2 minutes.

The semi-moist cranberries had excellent flavor and were chewy in texture and had a wrinkled collapsed appearance.

EXAMPLE XIII

Cranberry syrup resulting from Example XII was dried as is or after dilution with water at ratios of cranberry syrup to water at 2 to 1, and 1 to 1 by volume. Three, three-hundred milliliters of the syrup (undiluted and diluted) were placed in three round porcelain pans to a depth of approximately ½ inch. The pans were placed in a blast freezer (at −28° C.) for 45 minutes. The partially frozen syrup was then placed in a freeze-dryer for approximately 45 hours under vacuum of 0.10 mm and a condenser temperature of −38° to −40° C. No heat was applied to the product during freeze drying. The following table presents data on weight of the syrup, dilution factor, syrup's soluble solids (°Brix), and yield of dried product.

| Sample # | Syrup Weight (gm) | Syrup Brix | Dilution w/water | Weight of dried product (gm) |
|---|---|---|---|---|
| 1 | 338.5 | 37.5 | 1:0 | 138.1 |
| 2 | 322.0 | 26.5 | 2:1 | 89.2 |
| 3 | 319.1 | 20.0 | 1:1 | 67.9 |

The novel freeze-dried cranberry syrup had a taffy-like consistency, a moisture content of 4–9%, excellent cranberry color, and the distinct tangy but sweetened cranberry flavor. It could be eaten as a candy or used for other food products where natural cranberry flavor and color is needed.

EXAMPLE XIV

Cranberry syrup resulting from Example XII was diluted with water at ratios of cranberries to water by volume of 1 to 3, 1 to 5, and 1 to 10. The diluted syrups was then blast frozen, then freeze-dried as described in Example XIII. After 56 hours of freeze-drying sweetened cranberry crystals were collected. This novel product had a moisture content of 1–2%, was cranberry-red in color, and possessed a sweetened but tangy cranberry flavor. The product is suited for use in coloring and flavoring foods where natural cranberry color and flavor are desired, i.e., pancake syrup, jelly, etc. This novel product is shelf stable and presents a great reduction in volume and weight from the natural cranberry fruit.

It will thus be seen that the object set forth above, among those made apparent from the preceding description, are efficiently attained and, since certain changes may be made in carrying out the above method and in the article set forth without departing from the scope of the invention, it is intended that all matter contained in the above description shall be interpreted as illustrative and not in a limiting sense.

I claim:

1. A process for producing a sweetened, semi-moist cranberry product having a moisture content in the range of 10% to 40% comprising:
   (a) rupturing cranberries;
   (b) coating said ruptured fresh or frozen cranberries with an effective amount of sugar to initiate osmotic liquid sugar exchange;
   (c) continuing the osmotic liquid-sugar exchange within the cranberries in which juices migrate outward from the cranberries and sugar migrates into the cranberries by the osmotic exchange until the sugar concentration reaches an equilibrium across the cranberries to produce a mixture of sugared cranberries and sugared cranberry syrup.
   (d) separating the syrup from the cranberries;
   (e) rinsing the cranberries to remove surface sugar and syrup from outside the cranberries;
   (f) drying the sweetened cranberries in a vacuum atmosphere of up to 400–1200 microns Hg; and
   (g) suddenly releasing the vacuum atmosphere within 1 to 2 minutes to collapse the cranberries to a relatively wrinkled solid, chewy and palatable condition.

2. The process as set forth in claim 1 in which the ratio of cranberries to sugar, by weight is 3 to 1.

3. The process as claimed in claim 2 in which the sugar is sucrose.

4. The process as claimed in claim 1 in which the ratio of cranberries to sugar, by weight, is 2 to 1.

5. The process as set forth in claim 4, in which the sugar is a high fructose corn syrup.

6. The process as set forth in claim 1 in which the soluble solids of the cranberries Brix ranged from 19° Brix to 33° Brix after sugar equilibrium had been reached.

7. The process as set forth in claim 1 in which the water content of the semi-moist cranberry product range is at least 12% by weight.

8. The process as set forth in claim 1 including combining portions of citrus peel with the cranberries before sweetening the combined fruits as set forth in step (b).

9. The process as set forth in claim 8 in which the citrus fruit comprises orange peel.

10. The product as produced by the process in claim 1.

11. The product as produced by the process of claim 8.

12. The process of claimed in claim 1 in which said sugared fruit syrup of steps (c) and (d) is diluted with water and is dried until moisture level reaches from 1-2% and the dried sugared fruit syrup has a crystalline form.

13. The process as claimed in claim 1 in which said sugared fruit syrup of steps (c) and (d) is diluted with water and is dried until the moisture level reaches from 4-9% and the dried fruit syrup has reached a taffy-like consistency.

14. A process for producing a sweetened, semi-moist fruit product comprising any one of blueberries, cherries or sliced cranberries having a moisture content in the range of 10% to 40% by weight comprising;
   (a) coating the fruit with an effective amount of sugar to initiate osmotic liquid-sugar exchange,
   (b) continuing the osmotic liquid-sugar exchange within the fruit in which the juices of the fruit migrate outward and sugar migrates into the fruit by the osmotic exchange until the sugar concentration reaches an equilibrium across the fruit to produce a mixture of sugared fruit and sugared fruit syrup;
   (c) separating the sugared fruit syrup from the fruit;
   (d) rinsing the fruit to remove surface sugar and syrup from the outside of the fruit;
   (e) drying the sugared fruit in a vacuum atmosphere of up to 400-1200 microns Hg;
   (f) suddenly releasing the vacuum atmosphere within 1 to 2 minutes to collapse the fruit to a relatively wrinkled solid, chewy and palatable condition.

15. The process as claimed in claim 14 in which said sugared fruit syrup of steps (b) & (c) is diluted with water and is dried until the moisture level reaches from 1-2% and the dried fruit syrup has a crystalline form.

16. The product as produced by the process of claim 14.

17. The process as claimed in claim 15 in which said sugared fruit syrup of steps (b) and (c) is diluted with water and dried until the moisture level reaches from 4-9% and the syrup has reached a taffy-like consistency.

* * * * *